United States Patent
Takagi et al.

(10) Patent No.: US 12,411,068 B2
(45) Date of Patent: Sep. 9, 2025

(54) PARTICLE SIZE DISTRIBUTION MEASUREMENT METHOD, PARTICLE SIZE DISTRIBUTION MEASUREMENT DEVICE, AND CALCULATION DEVICE

(71) Applicants: Hitachi High-Tech Corporation, Tokyo (JP); NATIONAL INSTITUTES FOR CULTURAL HERITAGE, Tokyo (JP)

(72) Inventors: Hiroyuki Takagi, Tokyo (JP); Taisuke Murata, Nara (JP)

(73) Assignees: HITACHI HIGH-TECH CORPORATION, Tokyo (JP); NATIONAL INSTITUTES FOR CULTURAL HERITAGE, Tokyo (JP)

( * ) Notice: Subject to any disclaimer, the term of this patent is extended or adjusted under 35 U.S.C. 154(b) by 422 days.

(21) Appl. No.: 17/925,038

(22) PCT Filed: Mar. 23, 2021

(86) PCT No.: PCT/JP2021/011881
§ 371 (c)(1),
(2) Date: Nov. 14, 2022

(87) PCT Pub. No.: WO2021/240975
PCT Pub. Date: Dec. 2, 2021

(65) Prior Publication Data
US 2023/0184656 A1    Jun. 15, 2023

(30) Foreign Application Priority Data
May 27, 2020   (JP) .................. 2020-092533

(51) Int. Cl.
*G01N 15/02*   (2024.01)
*G01N 23/046*   (2018.01)
*G01N 23/083*   (2018.01)

(52) U.S. Cl.
CPC ........... *G01N 15/02* (2013.01); *G01N 23/046* (2013.01); *G01N 23/083* (2013.01); *G01N 2223/04* (2013.01); *G01N 2223/419* (2013.01)

(58) Field of Classification Search
CPC ........... G01N 15/0227; G01N 15/1433; G01N 23/046; G01N 15/1429; G01N 15/02;
(Continued)

(56) References Cited

U.S. PATENT DOCUMENTS

| 6,970,243 B2 * | 11/2005 | Togawa | G01N 15/0205 356/336 |
| 9,714,893 B2 * | 7/2017 | Driscoll | G01N 15/02 |
| 11,826,187 B2 * | 11/2023 | Miller | G01N 23/041 |

FOREIGN PATENT DOCUMENTS

JP    02-55934 A    2/1990

OTHER PUBLICATIONS

International Search Report of PCT/JP2021/011881 dated May 25, 2021.

* cited by examiner

*Primary Examiner* — An H Do
(74) *Attorney, Agent, or Firm* — Mattingly & Malur, PC

(57) ABSTRACT

A particle size distribution measurement method includes: an image acquisition step of acquiring a first CT image of a target sample including the granules; a statistical value calculation step of specifying a region of interest by dividing the acquired first CT image into predetermined grids, and calculating a first statistical value including a grid statistical value for each of the grids and an overall statistical value of the entire first CT image regarding a CT value; and a measurement step of measuring a particle size distribution of the granules in the target sample based on the first statistical value and a second statistical value including a grid statistical value and an overall statistical value of a type same as (Continued)

the grid statistical value and the overall statistical value included in the first statistical value in a second CT image of a standard sample including granules having a known particle size.

13 Claims, 12 Drawing Sheets

(58) Field of Classification Search
CPC .......... G01N 23/083; G01N 2223/641; G01N 2223/419; G01N 2223/04; G06T 7/60; G06T 2207/10081
See application file for complete search history.

[FIG. 1]
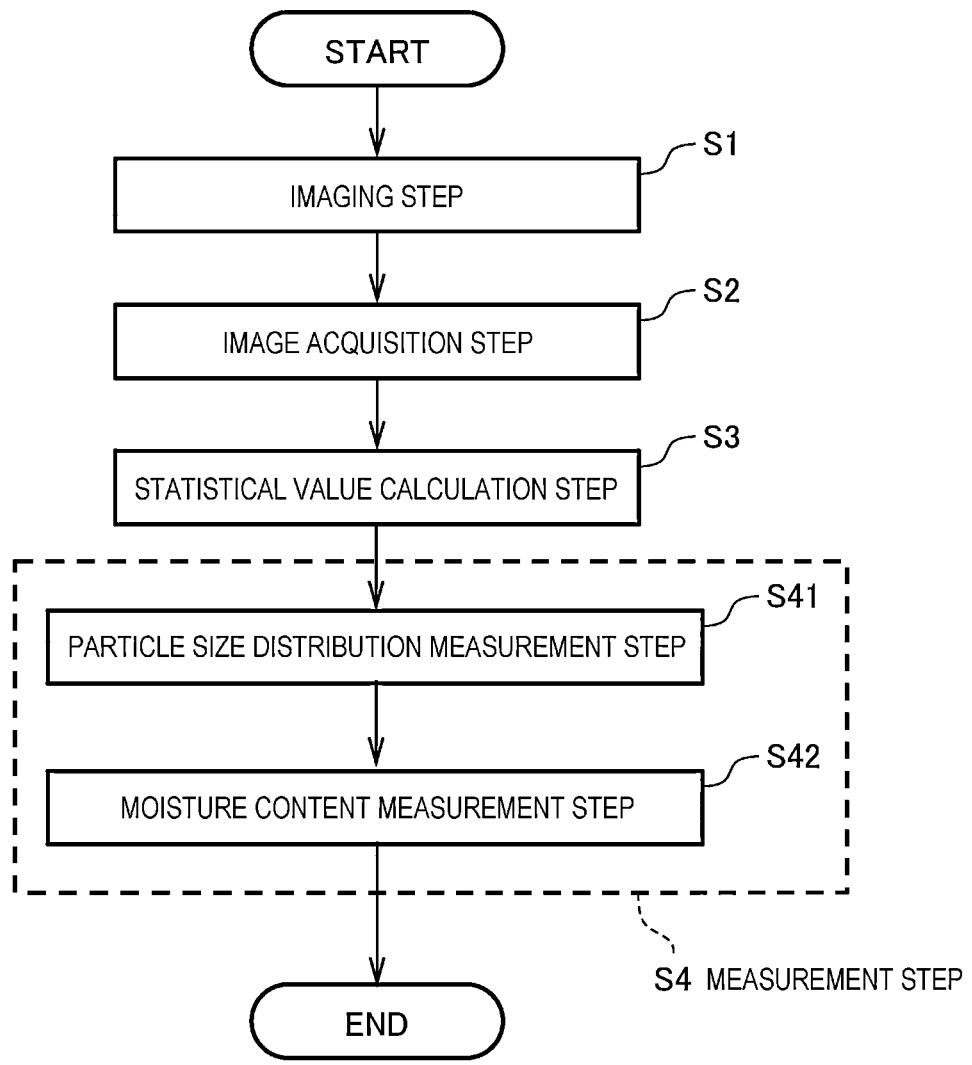

[FIG. 2]
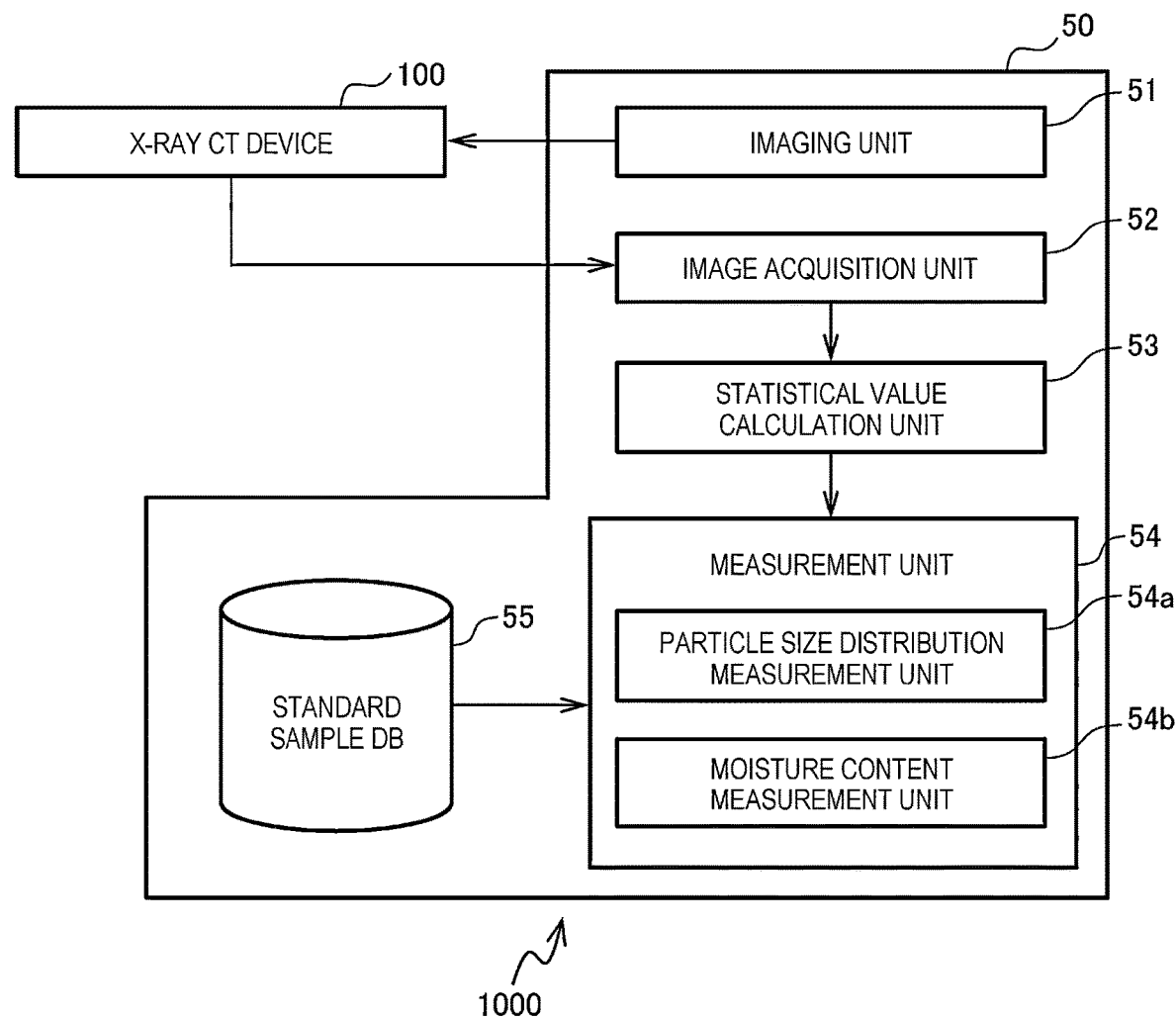

[FIG. 3]
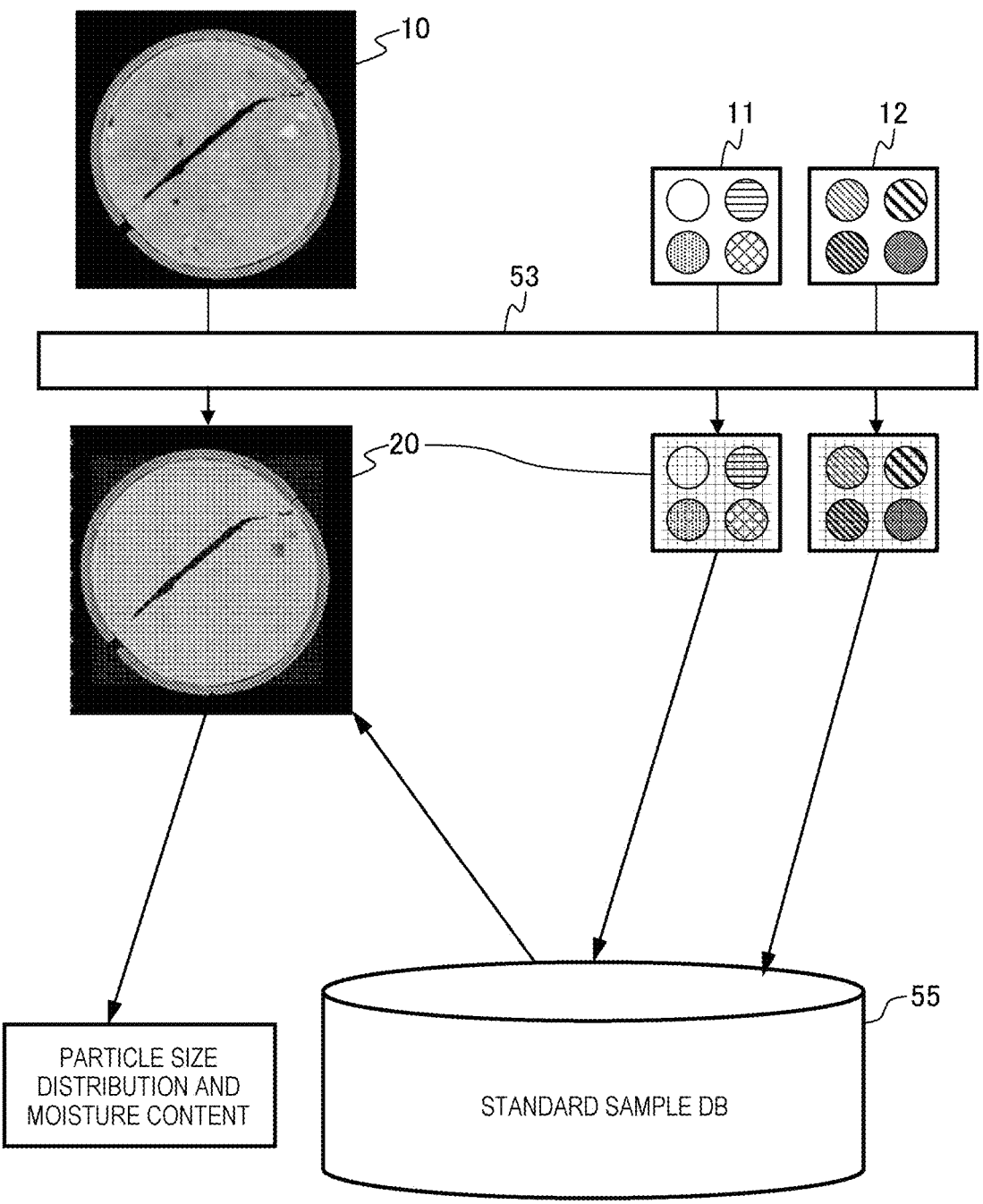

[FIG. 4]
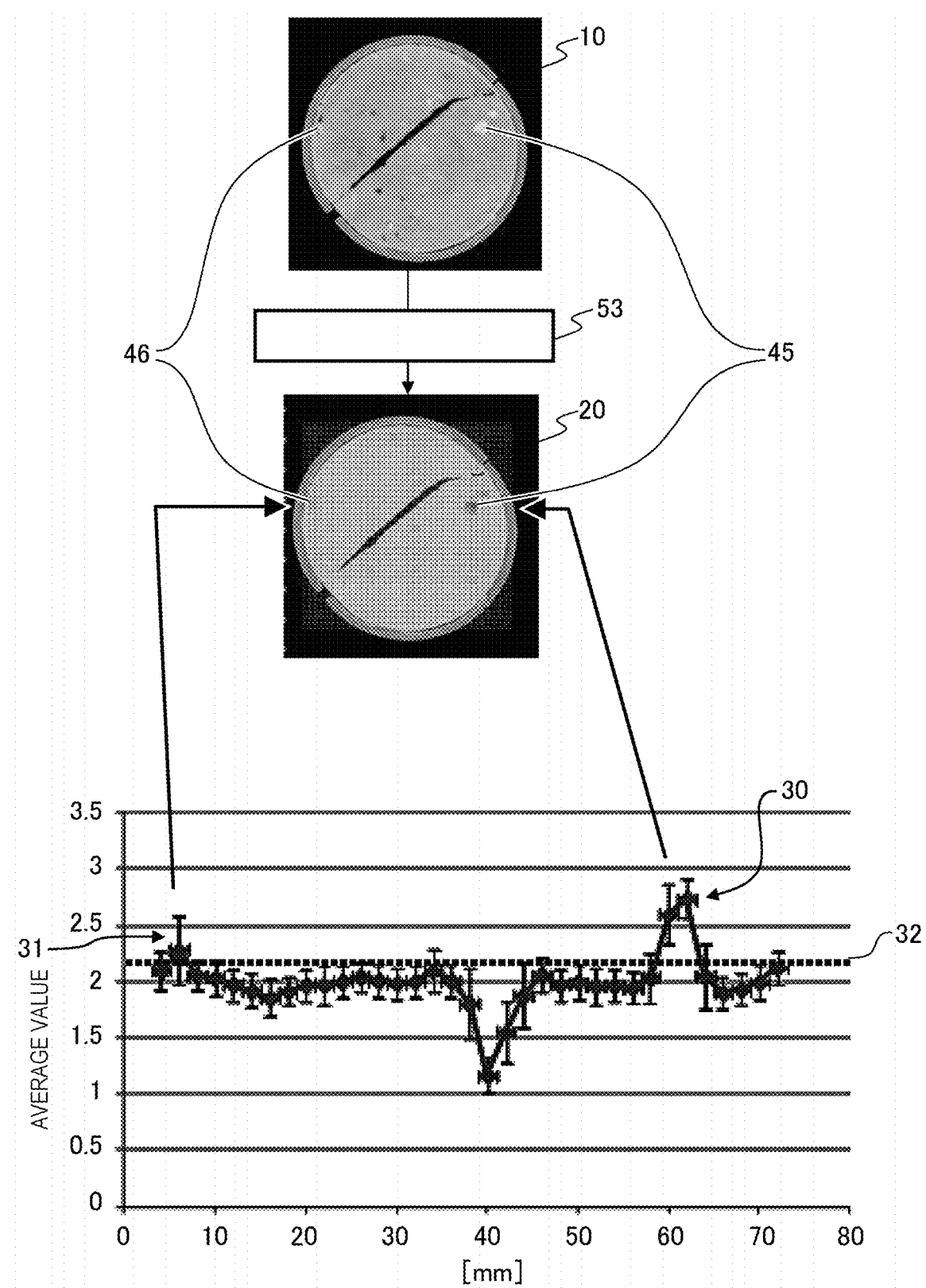

[FIG. 5]
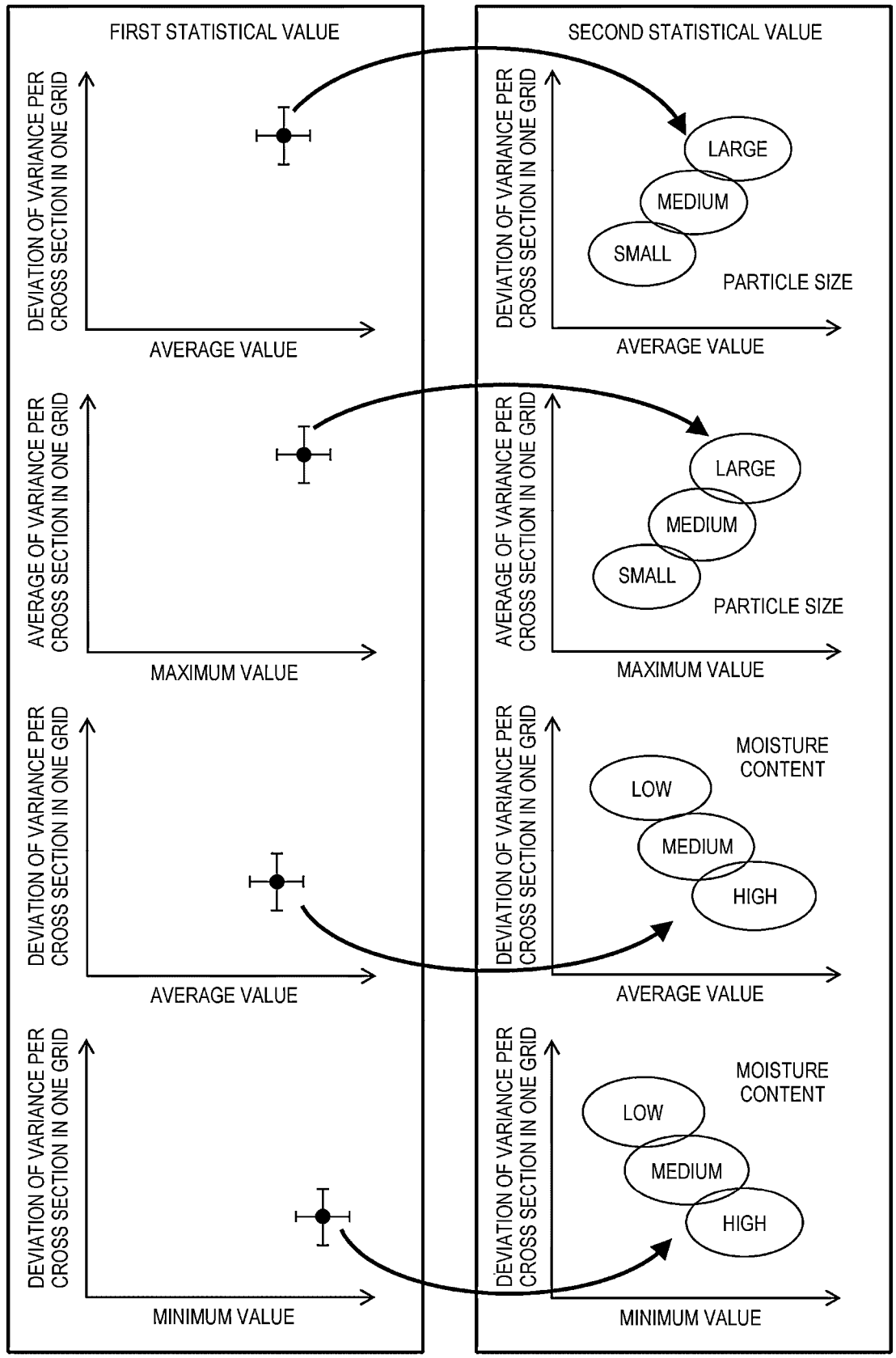

[FIG. 6]
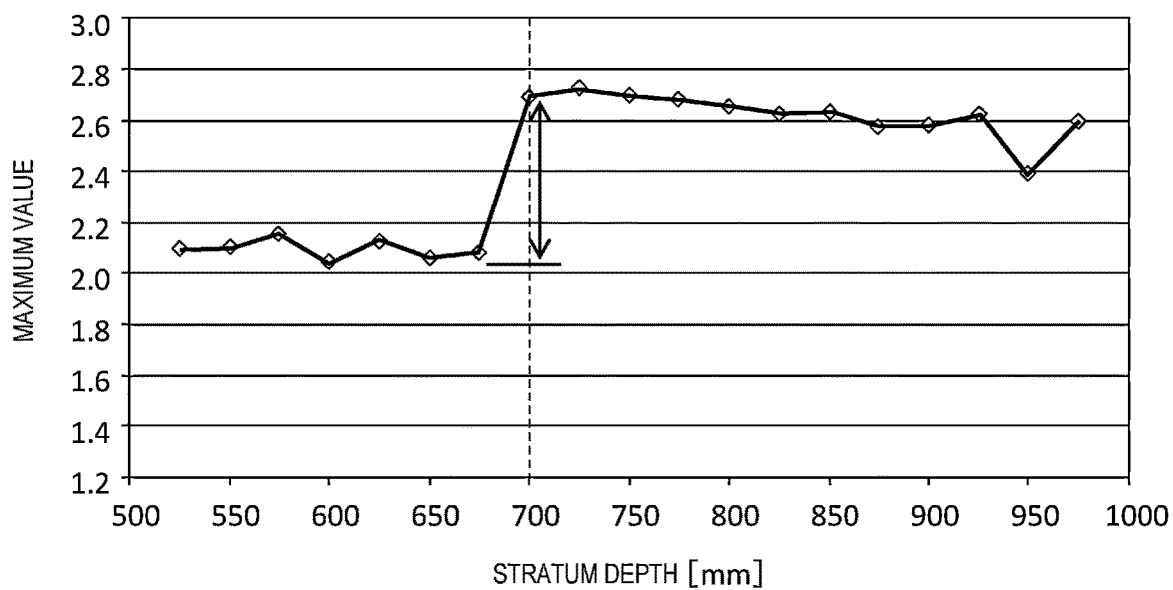
[FIG. 7]
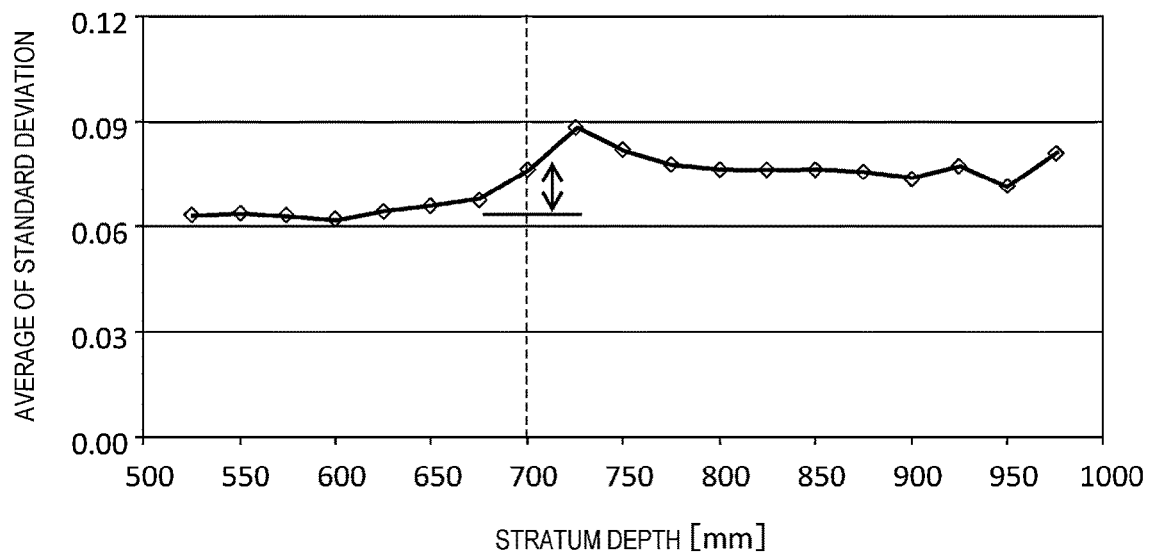

[FIG. 8]
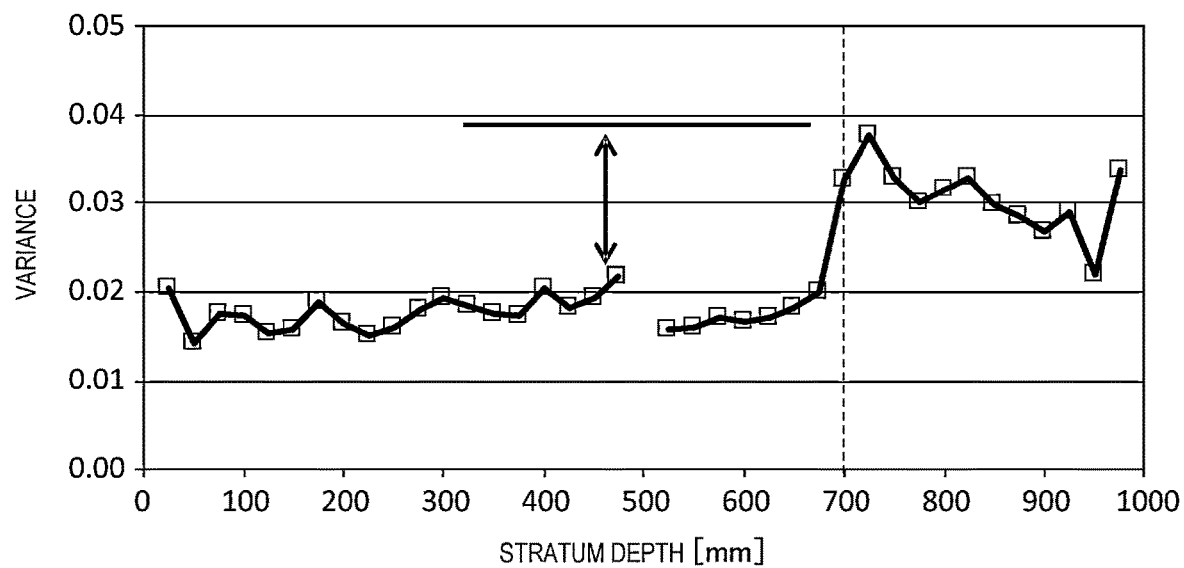
[FIG. 9]
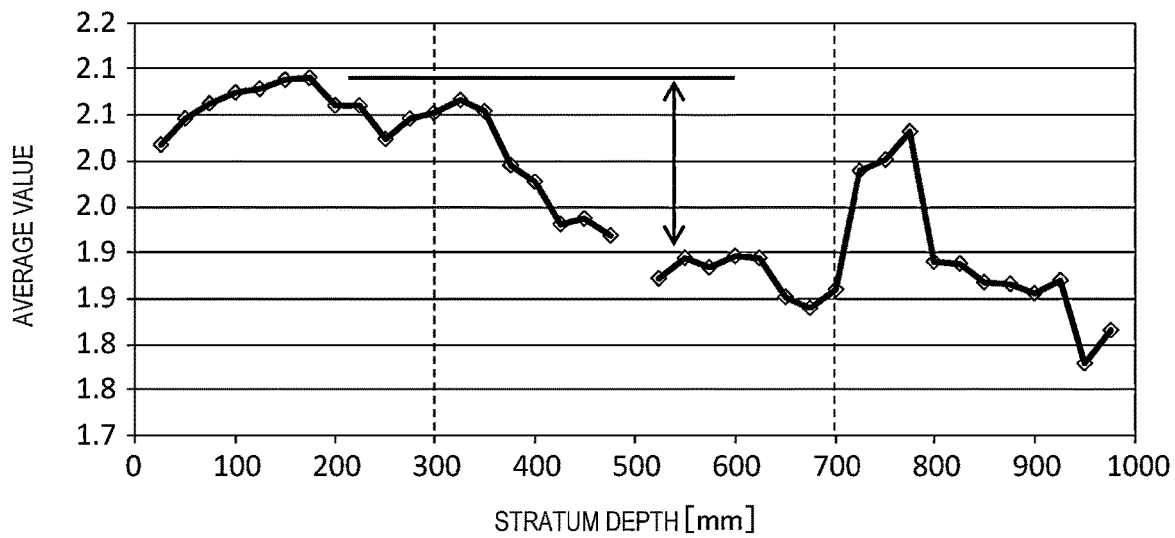

[FIG. 10]
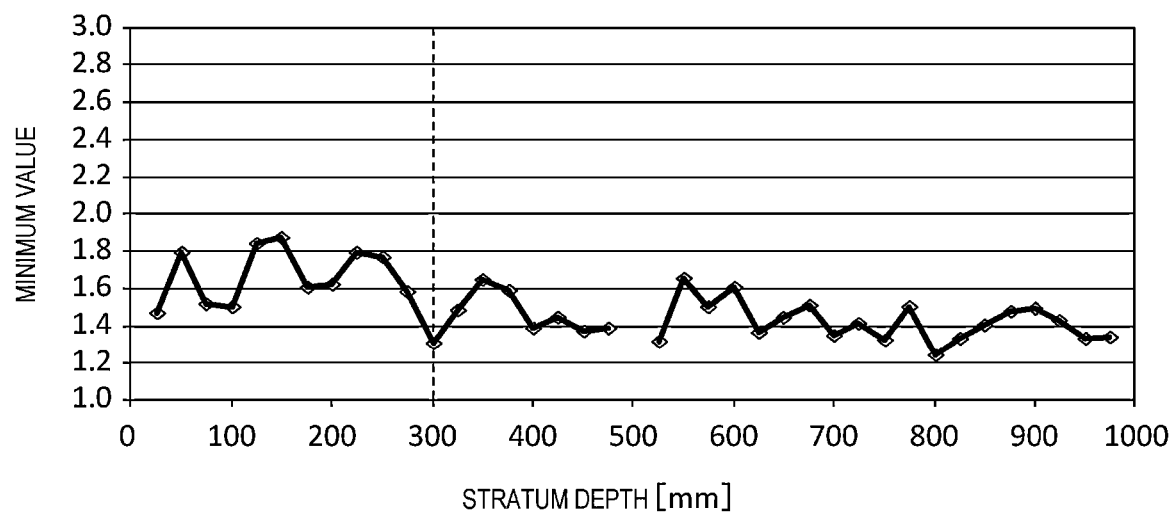

[FIG. 11]
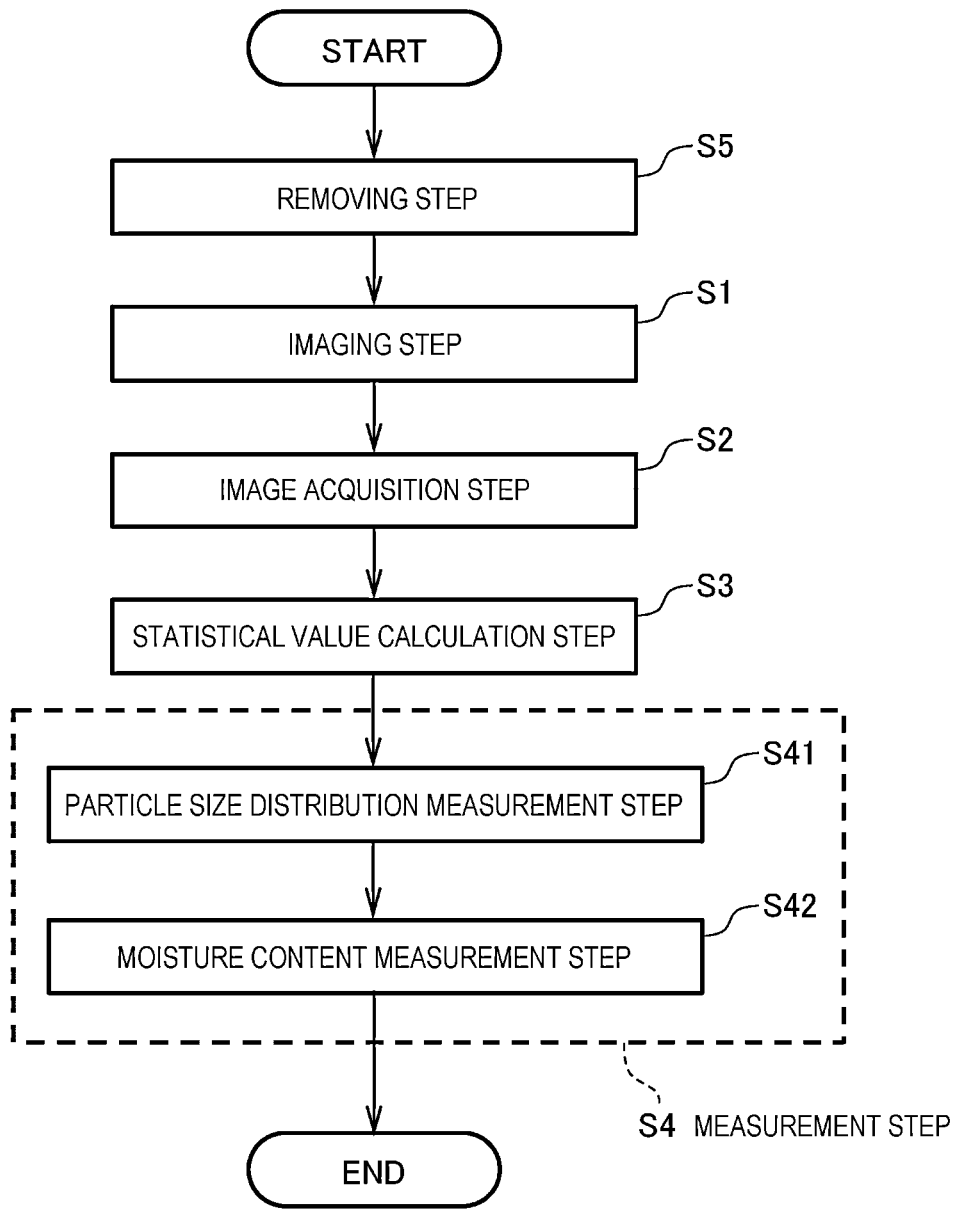

[FIG. 12]
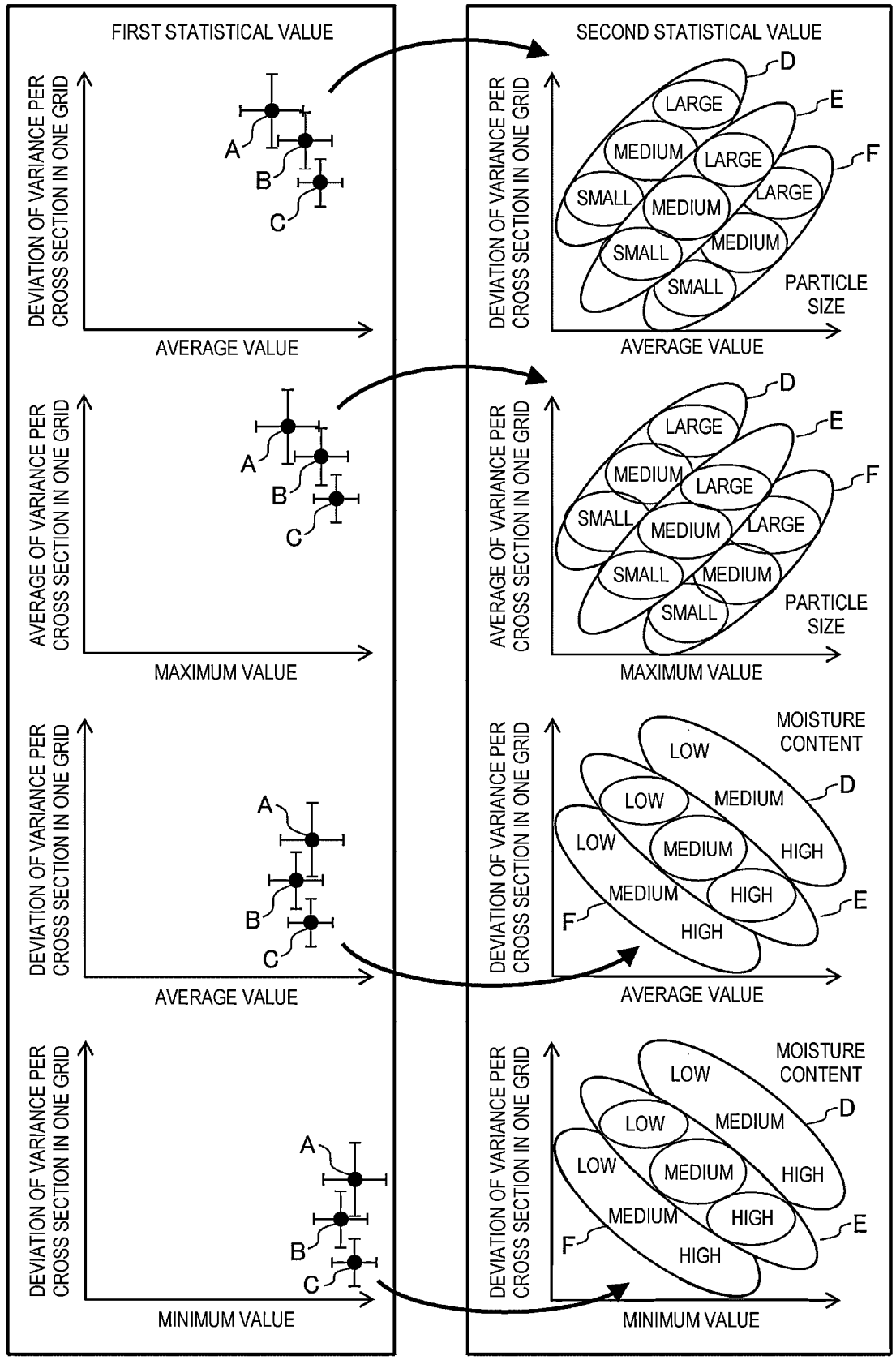

[FIG. 13]
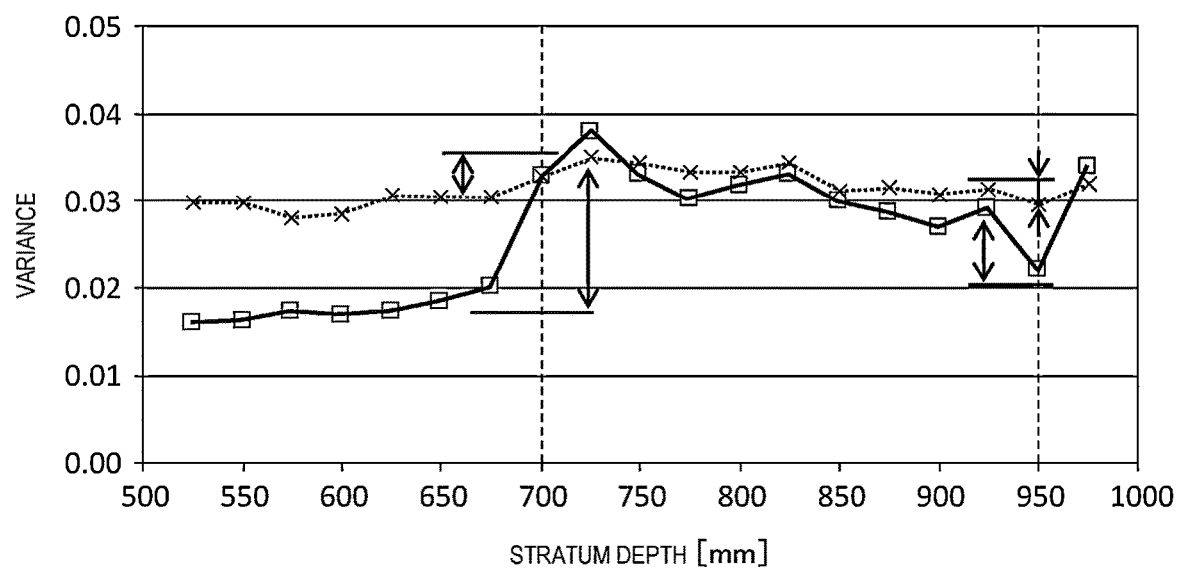

[FIG. 14]
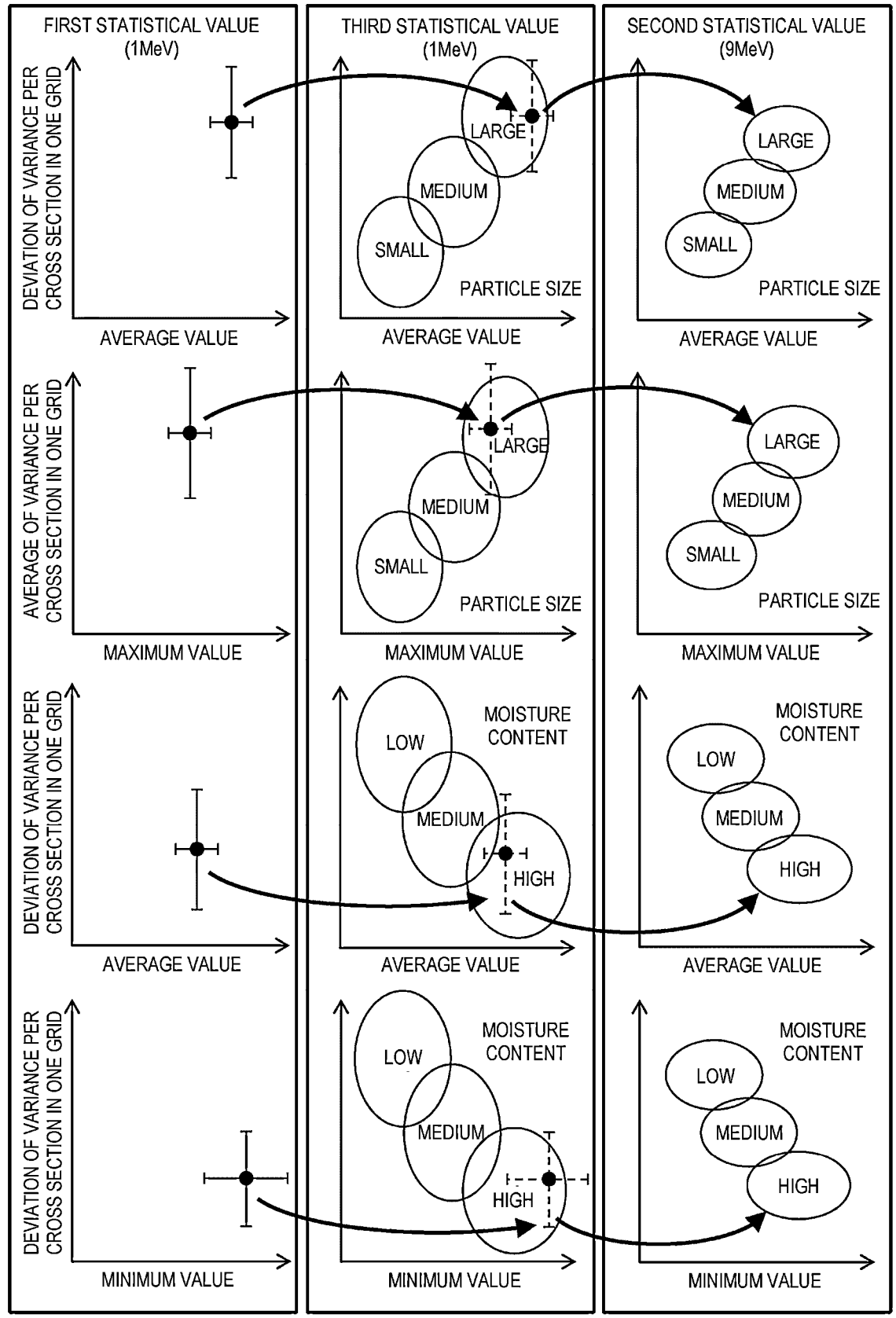

PARTICLE SIZE DISTRIBUTION MEASUREMENT METHOD, PARTICLE SIZE DISTRIBUTION MEASUREMENT DEVICE, AND CALCULATION DEVICE

TECHNICAL FIELD

The present invention relates to a particle size distribution measurement method, a particle size distribution measurement device, and a calculation device.

BACKGROUND ART

As a technique of measuring a particle size distribution of granules using X-rays, a technique disclosed in PTL 1 is known. PTL 1 discloses a particle size distribution measurement device in which a suspension liquid obtained by dispersing a granular material to be measured in a medium liquid is precipitated in a sample cell, and a temporal change in a concentration of the suspension liquid in a precipitation process is detected to obtain a particle size distribution of the granular material to be measured based on the Stokes' law of resistance. The particle size distribution measurement device includes an X-ray source, an X-ray detector configured to detect an amount of X-rays transmitted through the sample cell from the X-ray source, a visible light source, a photodetector configured to detect a sample cell transmission light table of light from the visible light source, a selection unit configured to selectively drive one of the X-ray source and the visible light source, and a signal switching switch for adopting a signal corresponding to output signals of the X-ray detector and the photodetector as a detection signal of the concentration of the suspension liquid in conjunction with a selection operation by the selection unit.

CITATION LIST

Patent Literature

PTL 1: Japan Unexamined Patent Application Publication No. JP-H02-055934 A

SUMMARY OF INVENTION

Technical Problem

In the technique disclosed in PTL 1, the particle size distribution of the granules dispersed in the suspension liquid is measured. Therefore, since extraction evaluation is performed only on a part of evaluation samples, a situation may occur in which a problem occurs in reliability as to whether an evaluation result can sufficiently evaluate an attribute of the sample. Therefore, in the method of the related art, there are problems that an irreversible destruction test is performed and a measurement time for one sample is long. That is, a technique of measuring the particle size distribution of the granules at a high speed in a non-destructive way is desired.

A problem to be solved by the invention is to provide a particle size distribution measurement method, a particle size distribution measurement device, and a calculation device capable of measuring a particle size distribution at a high speed in a non-destructive way.

Solution to Problem

The invention relates to a particle size distribution measurement method for measuring a particle size distribution of granules having an unknown particle size distribution. The particle size distribution measurement method includes: an image acquisition step of acquiring a first CT image of a target sample including the granules; a statistical value calculation step of specifying a region of interest by dividing the acquired first CT image into predetermined grids, and calculating a first statistical value including a grid statistical value for each of the grids and an overall statistical value of the entire first CT image regarding a CT value; and a measurement step including a particle size distribution measurement step of measuring a particle size distribution of the particles in the target sample based on the first statistical value and a second statistical value, the second statistical value including a grid statistical value and an overall statistical value of a type same as the grid statistical value and the overall statistical value included in the first statistical value in a second CT image of a standard sample including particles having a known particle size. Other solutions will be described later in embodiments for carrying out the invention.

BRIEF DESCRIPTION OF DRAWINGS

FIG. 1 is a flowchart showing a particle size distribution measurement method according to a first embodiment.

FIG. 2 is a block diagram of a particle size distribution measurement device according to the first embodiment and a calculation device included therein.

FIG. 3 is a schematic diagram showing the particle size distribution measurement method according to the first embodiment.

FIG. 4 is a diagram showing a change in an average value of a CT value at a boundary between gravel and sand.

FIG. 5 is a diagram for comparing a first statistical value of a target sample with a second statistical value of a standard sample.

FIG. 6 is a graph showing a change in a maximum value of the CT value with respect to a stratum depth.

FIG. 7 is a graph showing a change in an average of a standard deviation of the CT value with respect to the stratum depth.

FIG. 8 is a graph showing a change in a variance of the CT value with respect to the stratum depth.

FIG. 9 is a graph showing a change in the average value of the CT value with respect to the stratum depth.

FIG. 10 is a graph showing a change in a minimum value of the CT value with respect to the stratum depth.

FIG. 11 is a flowchart showing a particle size distribution measurement method according to a second embodiment.

FIG. 12 is a diagram for comparing a first statistical value of a target sample with a second statistical value of a standard sample, and is a diagram in a case in which there are a plurality of grids.

FIG. 13 is a graph showing a difference between a first statistical value by X-ray CT at 1 MeV and a first statistical value by X-ray CT at 9 MeV.

FIG. 14 is a diagram for comparing the first statistical value of the target sample with a third statistical value and the second statistical value of the standard sample.

DESCRIPTION OF EMBODIMENTS

Hereinafter, an embodiment (first embodiment) will be described. However, the invention is not limited to the following contents and the contents shown in the drawings, and can be freely modified and implemented within a range without departing from the scope of the invention. The invention can be implemented by combining different embodiments. In the following description, the same reference numerals are given to the same members in the different embodiments, and redundant description will be omitted. In addition, the same functions are denoted by the same names, and redundant description thereof will be omitted.

First Embodiment

FIG. 1 is a flowchart showing a particle size distribution measurement method according to a first embodiment (hereinafter, simply referred to as a "measurement method according to the first embodiment"). FIG. 2 is a block diagram of a particle size distribution measurement device 1000 according to the first embodiment and a calculation device 50 included therein. The measurement method according to the first embodiment can be executed by, for example, the measurement device 1000 shown in FIG. 2. Therefore, FIG. 1 will be described with reference to FIG. 2 as appropriate.

Although not shown, the calculation device 50 includes, for example, a central processing unit (CPU), a random access memory (RAM), a read only memory (ROM), and an interface (I/F). The calculation device 50 is embodied by the CPU executing a predetermined control program stored in the ROM.

In the measurement method according to the first embodiment, a particle size distribution of granules having an unknown particle size distribution is measured. The granules are a mixture of particles having various particle sizes. The granules are, for example, massive soil and metal granular materials contained in a container. For example, soil includes soil particles having various particle sizes. For example, a metal includes metal particles having various particle sizes. The metal is, for example, granules that can be used in a 3D printer. Hereinafter, granules constituting a target sample contain, for example, soil. When the soil is contained, a particle size distribution of the soil particles in the soil can be measured.

The measurement method according to the first embodiment includes an imaging step S1, an image acquisition step S2, a statistical value calculation step S3, and a measurement step S4. The measurement step S4 includes a particle size distribution measurement step S41 and a moisture content measurement step S42. In the first embodiment, for example, the moisture content is also measured in addition to the particle size distribution.

In the imaging step S1, an internal cross section of the target sample is imaged by X-ray CT (computed tomography) having first energy that is the same as second energy for acquiring a second CT image 11 (see FIG. 3 to be described later). A first CT image 10 (see FIG. 3) including the cross section of the granules is obtained by imaging the target sample. The imaging can be performed by controlling an X-ray CT device 100 by an imaging unit 51 in the calculation device 50, all shown in FIG. 2.

In the image acquisition step S2, the calculation device 50 acquires the first CT image 10 (see FIG. 3) imaged by the X-ray CT device 100. The image acquisition step S2 can be executed by an image acquisition unit 52 in the calculation device 50. The particle size distribution of the granules in the internal cross section is measured based on the acquired first CT image 10.

In the statistical value calculation step S3, a region of interest is specified by dividing the acquired first CT image 10 (see FIG. 3) into predetermined grids, and a first statistical value including a grid statistical value for each of the grids and an overall statistical value of the entire first CT image 10 regarding a CT value, is calculated. The statistical value calculation step S3 can be executed by a statistical value calculation unit 53 in the calculation device 50. The statistical value calculation step S3 will be described with reference to FIG. 3.

FIG. 3 is a schematic diagram showing the particle size distribution measurement method according to the first embodiment. In FIG. 3, the second CT images 11 and 12 are not actual CT images but schematically shown. In the shown example, the statistical value calculation unit 53 (see FIG. 2) divides the first CT image 10 reconstructed with a pixel size of 0.2 mm into a grid-shaped region of interest 20 of 2.0 mm×2.0 mm. At this time, 100 pixels are present in each of the grids. The CT value is determined for each of the pixels.

The statistical value calculation unit 53 calculates the first statistical value. As described above, the first statistical value includes the grid statistical value for each of the grids and the overall statistical value of the entire first CT image 10 regarding the CT value. The grid statistical value includes, for example, at least one of a maximum value, a minimum value, an average value, and a variance for 100 pixels in each of the grids. The overall statistical value of the entire first CT image 10 includes, for example, at least one of a deviation of the variance per cross section in one grid (the deviation of the variance in the entire first CT image 10) and an average of the variance per cross section in one grid (the average of the variance in the entire first CT image 10). Hereinafter, for simplification of description, "a deviation of the variance per cross section in one grid" is simply referred to as "a deviation of the variance", and "an average of the variance per cross section in one grid" is simply referred to as "an average of the variance".

In the first statistical value, for example, the average value of the CT value well represents an average density value in a limited region. The average density value tends to have a positive correlation with the particle size. For example, soil having a particle size of more than 2 mm is classified into gravel having a large average density value, and soil having a particle size of 2 mm or less is classified into sand having a small average density value. Therefore, when grids of 2 mm are used, the average value of the CT value changes at a boundary between the gravel and the sand.

FIG. 4 is a diagram showing a change in the average value of the CT value at the boundary between the gravel and the sand. The first CT image 10 includes medium-sized gravel 45 and fine-sized gravel 46. In the region of interest 20, it can be determined that a grid having an average value larger than a threshold 32 (that is, a large density) includes the gravel 45 and 46 having a grid size or more, that is, a particle size of 2 mm or more. It can be determined that the fine-sized gravel 46 is present in a region 31 that is a grid in which a density thereof is not so high and a variance (a length of a bar) of the grid is increased because there is only one grid exceeding the threshold 32. Further, it can be determined that the medium-sized gravel 45 is present in a region 30 in which there are two grids exceeding the threshold 32.

Returning to FIG. 3, the same applies to a second statistical value related to the particle size and including a grid statistical value and an overall statistical value of a type same as the grid statistical value and the overall statistical value included in the first statistical value in a second CT image of a standard sample including granules having a known particle size. That is, for the standard sample in which the particle size is intentionally changed, the second statistical value is calculated based on the second CT image 11 in the same manner as the calculation of the first statistical value. The calculated second statistical value is recorded in a standard sample DB 55 (see FIG. 1). Then, the particle size of the target sample can be measured by comparing the second statistical value with the first statistical value having an unknown particle size.

In addition, in the first embodiment, the second statistical value, which is related to a moisture content, is also similarly calculated in the second CT image 12 of the standard sample formed of granules having a known moisture content. For the standard sample in which the moisture content is intentionally changed, the second statistical value is calculated in the same manner as the calculation of the first statistical value. The calculated second statistical value is recorded in the standard sample DB 55 (see FIG. 1). Then, a moisture content of the target sample can be measured by comparing the second statistical value with the first statistical value having an unknown moisture content.

The first CT image 10 may include large-scale voids and inclusions other than the soil, such as large gravels. Therefore, density ranges of the inclusions are largely different in evaluating the particle size of the soil, and the inclusions may be a noise component with respect to an evaluation result of the soil. There is a case in which existence of a shell or the like in the soil is of significance in a history evaluation result of the soil. However, in order to efficiently perform evaluation and analysis of the soil itself, it is preferable to remove these regions which are out of a predetermined density range.

Therefore, in the first embodiment, the statistical value calculation unit 53 specifies the granules in the target sample in the first CT image 10, and specifies the region of interest 20 in the first CT image 10 by applying a region growth method to a specified portion. In this way, the particle size distribution can be measured in the region of interest 20 from which voids and inclusions such as large gravels are removed, and only the soil can be efficiently evaluated and analyzed based on a large number of CT images obtained by multistage imaging.

Returning to FIG. 1, the measurement step S4 includes the particle size distribution measurement step S41 of measuring the particle size distribution of the granules in the target sample based on the first statistical value and the second statistical value, and the moisture content measurement step S42 of measuring the moisture content of the granules. The particle size distribution measurement step S41 can be executed by a particle size distribution measurement unit 54*a* of a measurement unit 54 of the calculation device 50. The moisture content measurement step S42 can be executed by a moisture content measurement unit 54*b* of the measurement unit 54 of the calculation device 50. By the particle size distribution measurement step S41, the particle size distribution of the particles in a CT cross section can be measured. That is, the particle size distribution in the CT cross section can be measured by measuring the particle size for each grid. In addition, the moisture content in the CT cross section can be measured by the moisture content measurement step S42.

In the first embodiment, in the particle size distribution measurement step S41, the particle size distribution of the target sample is measured by comparing the first statistical value with a correlation between the predetermined second statistical value and the particle size. Further, in the moisture content measurement step S42, the moisture content is measured by comparing the first statistical value with the correlation between the predetermined second statistical value and the particle size. This point will be described with reference to FIG. 5.

FIG. 5 is a diagram for comparing the first statistical value of the target sample with the second statistical value of the standard sample. As described above, the first statistical value includes at least one of the average value, the maximum value, the minimum value, the variance, the deviation of the variance, and the average of the variance of the CT value. Then, for the target sample, in the shown example, a relationship between the average value and the deviation of the variance, a relationship between the maximum value and the average of the variance, a relationship between the average value and the deviation of the variance, and a relationship between the minimum value and the deviation of the variance are determined. The first statistical value including these relationships is determined based on the first CT image 10 (see FIG. 3).

As described above, the second statistical value related to the standard sample also includes at least one of the average value, the maximum value, the minimum value, the variance, the deviation of the variance, and the average of the variance. For the standard sample, relationships corresponding to those of the first statistical value, that is, a relationship among the average value, the deviation of the variance, and the particle size, a relationship among the maximum value, the average of the variance, and the particle size, a relationship among the average value, the deviation of the variance, and the moisture content, and a relationship among the minimum value, the deviation of the variance, and the moisture content are recorded in the standard sample DB 55 (see FIG. 2). The second statistical value including these relationships can be determined based on the second CT images 11 and 12 (see FIG. 3).

That is, in the standard sample DB 55, a correlation including at least one of a first correlation (a form of relationship; the same applies hereinafter) between the average value of the CT value and the particle size, a second correlation between the maximum value of the CT value and the particle size, a third correlation between the deviation of the variance of the CT value and the particle size, and a fourth correlation between the average of the variance and the particle size is recorded. A correlation including the minimum value may be recorded. By the first correlation, the second correlation, the third correlation, or the fourth correlation, the particle size distribution can be measured based on the average value, the maximum value, the minimum value, the deviation of the variance, or the average of the variance of the CT value.

Further, in the standard sample DB 55, a correlation including at least one of a fifth correlation between the deviation of the variance of the CT value and the moisture content, a sixth correlation between the average value of the CT value and the moisture content, and a seventh correlation between the minimum value of the CT value and the particle size is recorded. A correlation including the maximum value may be recorded. By the fifth correlation, the sixth correlation, or the seventh correlation, the moisture content can be measured.

A specific method for determining the correlations recorded in the standard sample DB 55 will be described.

As the standard sample, three groups having large, medium, and small particle sizes and three groups having high, medium, and low moisture contents are prepared for each of nine samples, and an appropriate number of 81 samples that are artificial and present in a natural world are prepared. That is, there are nine samples including a sample having a large particle size and a high moisture content, a sample having a large particle size and a medium moisture content, a sample having a large particle size and a low moisture content, a sample having a medium particle size and a high moisture content, a sample having a medium particle size and a medium moisture content, a sample having a medium particle size and a low moisture content, a sample having a small particle size and a high moisture content, a sample having a small particle size and a medium moisture content, and a sample having a small particle size and a low moisture content. Then, the second statistical value, the particle size, and the moisture content are measured by a destructive method in the related art as necessary for the samples. The above correlation is determined based on the measured second statistical value, the measured particle size, and the measured moisture content, and is recorded in the standard sample DB 55.

In the particle size distribution measurement step S41 (see FIG. 1), a plot of the first statistical value determined for the target sample is compared with the correlation recorded in the standard sample DB 55. By the comparison, the particle size and the moisture content at which the plot is located can be determined, and the particle size and the moisture content of the target sample can be determined as the particle size and the moisture content at which the plot is located.

In the first embodiment, the evaluation is performed for each cross section imaged by the X-ray CT device 100 (see FIG. 2). In addition, by dividing the cross section into, for example, about 10 regions, a difference in the particle size and a difference in the moisture content in the same cross section can be evaluated.

FIG. 6 is a graph showing a change in the maximum value of the CT value with respect to a stratum depth. In a case in which a long-term history of the target sample is recorded in cross-section units such as a boring core of a stratum, by performing CT imaging on each stratum, the maximum value of the CT value (that is, a density value in a CT cross section) is calculated for each cross section as shown by white plotted symbols in FIG. 6. By calculating the maximum value, it is possible to distinguish between a deposition region including sand having a large particle size and a region without such sand.

In an example in FIG. 6, the X-ray CT is performed on the same boring core for each stratum depth, and the calculated maximum value of the CT value is plotted. As shown in the graph, the maximum value of the CT value (density value) in one cross section significantly increases in a region having a stratum depth of 700 mm or more. Here, the size of the grid is 2 mm in the first embodiment. Therefore, the region having a stratum depth of 700 mm or more can be determined to be a region including sand having a large particle size of 2 mm or more (that is, gravel). On the other hand, a region having a stratum depth of less than 700 mm can be determined to be a region not including sand having a large particle size of 2 mm or more. In this way, by applying the grids of 2 mm, it is possible to evaluate the presence of sand having a particle size larger than 2 mm (that is, gravel) in an emphasized way.

FIG. 7 is a graph showing a change in an average of a standard deviation of the CT value with respect to the stratum depth. The graph shown in FIG. 7 is created based on the first CT image 10 (see FIG. 3) acquired when creating the graph in FIG. 6. In a target sample including granules having a relatively large particle size in a range smaller than the limited region in the grid, when the moisture content is low, the target sample includes a large number of voids having a specific gravity of 0, and thus there is a strong tendency that the variance of the CT value and the particle size have a positive correlation. That is, as the particle size is larger, the voids are more likely to be present between the particle sizes and the voids are increased, and thus the variance, that is, the average of the standard deviation tends to be larger. In this way, by calculating a plurality of statistical values with respect to the CT value in the CT image and using the correlation between the statistical values and the particle size, it is possible to evaluate the particle size and the moisture content in the sample, which are difficult to evaluate only based on a luminance value and a shape in the CT image due to a limitation of a spatial resolution and a limitation of a density resolution of the CT device.

As shown in FIG. 7, the average of the standard deviation, that is, the variance, changes so as to increase in the region having a stratum depth of 700 mm or more. Therefore, it can be determined that a large amount of sand having a particle size of 2 mm or more is included in the region having a stratum depth of 700 mm or more. This result shows the same result as the determination based on the maximum value as shown in FIG. 6. Therefore, for example, determination accuracy can be improved by performing the determination based on the maximum value and the determination based on the average of the standard deviation.

On the other hand, when the moisture content is high, water having a specific gravity of 1 enters between voids having a specific gravity of 0. Therefore, a deviation width from a soil component having a density of 1 or more is small, and the variance of the CT value and the moisture content have a negative correlation. Similarly, since air having a specific gravity of 0 is replaced with the water having a specific gravity of 1, the average value of the CT value in the grid has a positive correlation with the moisture content. Furthermore, as the moisture content increases, the air having a minimum density and a specific gravity of 0 is replaced with the water having a specific gravity of 1, and the minimum value of the CT value in one cross section tends to increase. In order to determine these points, it is preferable to perform evaluation based on each of the variance (average of the standard deviation), the average value, and the minimum value. A case of the moisture content will be described with reference to FIGS. 8 to 10.

FIG. 8 is a graph showing a change in the variance of the CT value with respect to the stratum depth. The variance is small in a region having a stratum depth of less than 700 mm, and the variance is large in the region having a stratum depth of 700 mm or more. Therefore, based on a result in FIG. 8, it can be determined that the moisture content is high at a stratum depth of less than 700 mm at which the variance is small.

FIG. 9 is a graph showing a change in the average value of CT value with respect to the stratum depth. The graph shown in FIG. 9 is created based on the first CT image 10 (see FIG. 3) acquired when creating the graph in FIG. 8. The average value is large when the stratum depth is less than 300 mm, and is small when the stratum depth is 300 mm or more. Therefore, based on the result in FIG. 9, it can be determined that the moisture content is high at a stratum depth of less than 300 mm at which the average value is large.

In FIG. 9, the average value is high at a stratum depth of 700 mm to 800 mm. However, in FIG. 8 described above, there is no large change in the variance at the stratum depth of 700 mm to 800 mm. Therefore, there is no large change in the moisture content at the stratum depth of 700 mm to 800 mm, and it is considered that the change in the average value in this region is caused by sand having a large particle size.

FIG. 10 is a graph showing a change in the minimum value of the CT value with respect to the stratum depth. The graph shown in FIG. 10 is created based on the first CT image 10 (see FIG. 3) acquired at the time of creating the graph in FIG. 8. The minimum value is relatively large at a stratum depth of less than 300 mm, and relatively small at a stratum depth of 300 mm or more. Therefore, based on the result in FIG. 10, it can be determined that the moisture content is high at a stratum depth of less than 300 mm at which the minimum value is large.

When the results in FIGS. 8 to 10 are combined, it can be determined that the moisture content is high when the stratum depth is less than 300 mm, and the moisture content is low when the stratum depth is 300 mm or more.

In this way, in the first embodiment, the second CT images 11 and 12 (see FIG. 3) are acquired in advance by the X-ray CT of the standard sample (having known particle size and moisture content), and the second CT images 11 and 12 are divided into limited regions of interest 20 (see FIG. 3), thereby calculating the second statistical value. Meanwhile, the first CT image 10 (see FIG. 3) is acquired by the X-ray CT of the target sample (having unknown particle size and moisture content), and the first CT image 10 is divided into the region of interest 20 in the same manner as the second CT images 11 and 12, thereby calculating the first statistical value. Then, by comparing the first statistical value and the second statistical value, the particle size and the moisture content of the target sample can be quantitatively measured at a high speed in a non-destructive way by using the second statistical value based on the standard sample having a known particle size. Accordingly, the particle size distribution of the granules in the first CT image 10 can be measured, and the moisture content thereof can be measured. By the non-destructive measurement, a large amount of boring cores and industrial metal powders can be automatically treated in a large amount.

In addition, for example, the particle size distribution and the moisture content (porosity) with respect to the boring core reflect a soil property of a soil deposit. The soil property is represented by, for example, a soil ternary diagram, and the soil can be classified into, for example, gravel, a mud, sand, a clay, and a silt. In addition, in evaluation of an entertainment behavior, the entertainment behavior also changes depending on the soil property. Then, based on a research result related to movement of a substance by Newton, Stokes, or the like, it is possible to predict a flow velocity of a river bed when an imaged cross section of the target sample is formed by application of the soil property to an entertainment curve of flow, sedimentation, and accumulation of particles obtained by accumulation of an experiment in geological and civil engineering. That is, by evaluating the particle size of a deposition system such as a boring core in deposition depth units, the flow velocity of the river bed for each age can be quantitatively predicted.

Then, important quantitative data for estimating a disaster history in a certain region can be acquired by estimating the flow velocity of the river bed for a large number of target samples in the certain region. Accordingly, the quantitative data which is an important guideline suitable for development of a disaster prevention plan of the region can be obtained.

Second Embodiment

FIG. 11 is a flowchart showing a particle size distribution measurement method according to a second embodiment. In the statistical value calculation step S3 (see FIG. 1) according to the first embodiment, the first CT image 10 and the second CT images 11 and 12 are divided into grids having a size of 2 mm×2 mm. However, in the second embodiment, the statistical value calculation step S3 is performed a plurality of times such that the grids have different sizes. Specifically, the first CT image 10 and the second CT images 11 and 12 are further divided into grids of 1 mm×1 mm and 4 mm×4 mm in addition to 2 mm×2 mm, and the same processing is repeated three times using the grids (three types) of respective sizes.

The measurement method according to the second embodiment includes a removing step S5 of removing an inclusion having a particle size equal to or larger than the size of the grid based on a plurality of first statistical values acquired based on the grids having different sizes. A specific method is the same as the method described with reference to FIGS. 3 and 4. In this way, it is possible to evaluate, in an emphasized way, presence of sand having a particle size of 1 mm in grids of, for example, 1 mm×1 mm, and sand having a particle size of 4 mm in grids of, for example, 4 mm×4 mm. Then, the inclusions can be removed based on the inclusions such as the sand evaluated in an emphasized way, and measurement accuracy of the particle size distribution of the granules can be improved.

FIG. 12 is a diagram for comparing the first statistical value of a target sample with a second statistical value of a standard sample, and is a diagram in a case in which a plurality of grids are included. In the second embodiment, since the same processing is repeated three times for each of the grids of the first CT image 10, the number of plots of the obtained first statistical values is three. Specifically, in FIG. 12, a plot A is a plot for grids of 1 mm×1 mm, a plot B is a plot for grids of 2 mm×2 mm, and a plot C is a plot for grids of 4 mm×4 mm. Meanwhile, a region D is a region for the grids of 1 mm×1 mm, a region E is a region for the grids of 2 mm×2 mm, and a region F is a region for the grids of 4 mm×4 mm. Then, the plots A, B, and C are compared to the regions D, E, and F of the second statistical value for each of the particle size and the moisture content.

As a result of the comparison, the particle size and the moisture content of the target sample can be measured by performing interpolation or extrapolation with the second statistical value of the standard sample in each of the regions D, E, and F as necessary. Accordingly, the measurement accuracy of the particle size distribution and the moisture content can be improved.

Third Embodiment

In the first embodiment, the first energy of X-rays used for the X-ray CT for acquiring the first CT image 10 and the second energy of the X-rays used for the X-ray CT for acquiring the second CT images 11 and 12 are the same (for example, 9 MeV). However, in a third embodiment, in the imaging step S1 (see FIG. 1), the first CT image 10 is obtained by X-ray CT using X-rays at first energy lower than second energy. Then, in the particle size distribution measurement step S41 (see FIG. 1), a particle size distribution of granules in a target sample is measured based on a first statistical value in the first CT image 10 obtained by the X-rays of the first energy and a second statistical value in the second CT images 11 and 12 obtained by the X-rays having second energy. In this way, the particle size distribution can be easily measured by the X-ray CT having the first energy, i.e., low energy, with which imaging can be easily performed.

The first energy lower than the second energy referred to here is, for example, 1 MeV, which is energy of the X-ray CT device 100 (see FIG. 2) having relatively low energy but many installation locations. Further, the second energy referred to here is, for example, 9 MeV, which is energy of the X-ray CT device 100 (see FIG. 2) having high statistical accuracy but a limited installation location. Therefore, in the first CT image 10 obtained by the X-ray CT having a relatively low energy of 1 MeV, the imaging is simple, but an X-ray dose is lower than 9 MeV by two digits or more, and thus a statistical error is large.

FIG. 13 is a graph showing a difference between a first statistical value by the X-ray CT at 1 MeV and a first statistical value by the X-ray CT at 9 MeV. The graph in FIG. 13 is obtained by imaging under the same conditions except that the energy of the X-rays used for the X-ray CT is different. A solid line is a graph showing a variance obtained based on a CT image at 9 MeV, and a dotted line is a graph showing a variance obtained based on the CT image at 1 MeV. When a stratum depth is about 700 mm and about 950 mm, a difference in the variance between the graph of the solid line and the graph of the dotted line is large. Therefore, in particular, at stratum depths of 700 mm and 950 mm, the statistical error is large in the graph of the solid line having high accuracy. As a result, measurement accuracy decreases. Therefore, in a measurement method according to the third embodiment, the first statistical value and the second statistical value are compared twice.

That is, in the third embodiment, in the particle size distribution measurement step S41 (see FIG. 1), the particle size distribution is primarily measured based on the first statistical value based on the first CT image 10 and a third statistical value in a third CT image (not shown) obtained by the X-rays at the first energy (for example, 1 MeV) for the standard sample. Next, in the particle size distribution measurement step S41 (see FIG. 1), for the primarily measured particle size distribution, secondary measurement of the particle size distribution is further performed based on the second statistical values in the second CT images 11 and 12 obtained by the X-ray CT at the second energy (for example, 9 MeV). In this way, after the particle size distribution is measured in a rough way by the primary measurement, the measured particle size distribution is further measured by the secondary measurement, thereby improving the measurement accuracy even when the first CT image 10 at the first energy having low accuracy is used.

FIG. 14 is a diagram for comparing the first statistical value of the target sample with the third statistical value and the second statistical value of the standard sample. In FIG. 14, for simplification, a part of items on a vertical axis are omitted. In the third embodiment, the third statistical value is acquired in the same manner as the acquisition of the second statistical value except that the energy of the X-rays used in the X-ray CT is different. For example, the first statistical value of the target sample and the third statistical value of the standard sample acquired using the X-rays at 1 MeV include more statistical errors than the second statistical value of the standard sample due to the low first energy of the X-rays in the X-ray CT. Therefore, first, the primary measurement is performed by comparing statistical values using the X-rays of the same first energy having the same statistical error, that is, the first statistical value of the target sample and the third statistical value of the standard sample.

With the comparison, there is a possibility that the particle size and the moisture content determined based on the third statistical value correspond to a plurality of values depending on a magnitude of the statistical error caused by the low energy of the X-rays when acquiring the first statistical value and the third statistical value. That is, only in the primary measurement, there is a possibility that the particle size and the moisture content cannot be narrowed down due to a large statistical error. Therefore, the secondary measurement is further performed. In the secondary measurement, suitability of the plurality of particle sizes and the moisture contents is determined based on the second statistical value that is highly accurate due to the high second energy. During the determination, interpolation or extrapolation to the second statistical value is performed as necessary. Accordingly, the suitability of the corresponding particle sizes and moisture contents is determined by the comparison with the third statistical value, and the measurement accuracy of the particle size distribution and the moisture content can be improved.

Through the primary measurement and the secondary measurement, a large amount of boring cores for which immediacy is required as primary evaluation can be automatically evaluated by the X-ray CT device 100 (see FIG. 2) which is widely used. In addition, the industrial metal powder can be evaluated at the same time at a plurality of manufacturing sites.

REFERENCE SIGNS LIST

10 first CT image
100 X-ray CT device
1000 measurement device
11 second CT image
12 second CT image
20 region of interest
50 calculation device
51 imaging unit
52 image acquisition unit
53 statistical value calculation unit
54 measurement unit
54*a* particle size distribution measurement unit
54*b* moisture content measurement unit
55 standard sample DB
S1 imaging step
S2 image acquisition step
S3 statistical value calculation step
S4 measurement step
S41 particle size distribution measurement step
S42 moisture content measurement step
S5 removing step

The invention claimed is:

1. A particle size distribution measurement method for measuring a particle size distribution of granules having an unknown particle size distribution, the particle size distribution measurement method comprising:
    an imaging step of obtaining a first CT image of a target sample including the granules by X-ray CT and a second CT image of a standard sample including granules having a known particle size by X-ray CT;
    an image acquisition step of acquiring the first CT image of the target sample including the granules;
    a statistical value calculation step of specifying a region of interest by dividing the acquired first CT image into predetermined grids, and calculating a first statistical value including a grid statistical value for each of the grids and an overall statistical value of the entire first CT image regarding a CT value; and
    a measurement step including a particle size distribution measurement step of measuring a particle size distribution of the granules in the target sample based on a second statistical value and the first statistical value, the second statistical value including a grid statistical value and an overall statistical value of a type same as the grid statistical value and the overall statistical value included in the first statistical value in the second CT image of a standard sample including granules having the known particle size.

2. The particle size distribution measurement method according to claim 1, wherein
in the particle size distribution measurement step, the particle size distribution is measured by comparing the first statistical value with a correlation between the second statistical value and a particle size.

3. The particle size distribution measurement method according to claim 2, wherein
the grid statistical value includes at least one of a maximum value, a minimum value, an average value, and a variance of the CT value,
the overall statistical value includes at least one of a deviation of the variance in the entire first CT image and an average of the variance in the entire first CT image, and
the correlation includes at least one of a first correlation between the average value of the CT value and the particle size, a second correlation between the maximum value of the CT value and the particle size, a third correlation between the deviation of the variance of the CT value and the particle size, and a fourth correlation between the average of the variance and the particle size.

4. The particle size distribution measurement method according to claim 1, wherein:
the imaging step of obtaining the first CT by X-ray CT is performed using an X-ray having a first energy lower than a second energy of an X-ray in X-ray CT for obtaining the second CT image, wherein
in the particle size distribution measurement step, the particle size distribution is measured based on the first statistical value in the first CT image obtained by the X-ray having the first energy and the second statistical value in the second CT image obtained by the X-ray having the second energy.

5. The particle size distribution measurement method according to claim 4, wherein
in the particle size distribution measurement step, the particle size distribution is primarily measured based on the first statistical value and a third statistical value in a third CT image obtained by the X-ray having the first energy for the standard sample, and secondary measurement of the particle size distribution is further performed based on the second statistical value in the second CT image for the primarily measured particle size distribution.

6. The particle size distribution measurement method according to claim 1, wherein
the statistical value calculation step is performed a plurality of times such that the grids have different sizes, and
a removing step of removing an inclusion having a particle size equal to or larger than the size of the grids based on a plurality of the first statistical values acquired based on the grids having different sizes is further included.

7. The particle size distribution measurement method according to claim 1, wherein
in the statistical value calculation step, the granules in the target sample are specified in the first CT image, and the region of interest in the first CT image is specified by applying a region growth method to a specified portion.

8. The particle size distribution measurement method according to claim 1, wherein
the granules contain soil.

9. The particle size distribution measurement method according to claim 8, wherein
the measurement step further includes a moisture content measurement step of measuring a moisture content of the granules.

10. The particle size distribution measurement method according to claim 9, wherein
in the moisture content measurement step, the moisture content is measured by comparing the first statistical value with a correlation between the second statistical value and the moisture content.

11. The particle size distribution measurement method according to claim 10, wherein
the grid statistical value includes at least one of a maximum value, a minimum value, an average value, and a variance of the CT value,
the overall statistical value includes at least one of a deviation of the variance in the entire first CT image, and an average of the variance in the entire first CT image, and
the correlation includes at least one of a fifth correlation between the deviation of the variance of the CT value and the moisture content, a sixth correlation between the average value of the CT value and the moisture content, and a seventh correlation between the minimum value of the CT value and the particle size.

12. A particle size distribution measurement device configured to measure a particle size distribution of granules having an unknown particle size distribution, the particle size distribution measurement device comprising:
an X-ray CT device configured to obtain a first CT image of a target sample including the granules by X-ray CT and a second CT image of a standard sample including granules having a known particle size by X-ray CT;
a calculation device including an image acquisition unit configured to acquire the first CT image of the target sample including the granules, a statistical value calculation unit configured to specify a region of interest by dividing the acquired first CT image into predetermined grids and calculate a first statistical value including a grid statistical value for each of the grids and an overall statistical value of the entire first CT image regarding a CT value, and a measurement unit including a particle size distribution measurement unit configured to measure a particle size distribution of the granules in the target sample based on a second statistical value and the first statistical value, the second statistical value including a grid statistical value and an overall statistical value of a type same as the grid statistical value and the overall statistical value included in the first statistical value in the second CT image of a standard sample including granules having the known particle size.

13. A calculation device configured to analyze a particle size distribution of granules having an unknown particle size distribution, the calculation device comprising:
an imaging unit configured to obtain a first CT image of a target sample including the granules by X-ray CT and a second CT image of a standard sample including granules having a known particle size by X-ray CT;

an image acquisition unit configured to acquire the first CT image of the target sample including the granules;

a statistical value calculation unit configured to specify a region of interest by dividing the acquired first CT image into predetermined grids and calculate a first statistical value including a grid statistical value for each of the grids and an overall statistical value of the entire first CT image regarding a CT value; and a measurement unit including a particle size distribution measurement unit configured to measure a particle size distribution of the granules in the target sample based on a second statistical value and the first statistical value, the second statistical value including a grid statistical value and an overall statistical value of a type same as the grid statistical value and the overall statistical value included in the first statistical value in the second CT image of a standard sample including granules having the known particle size.

* * * * *